Aug. 6, 1946.    K. C. LAUGHLIN    2,405,436
CATALYTIC DEHYDROGENATION
Filed Nov. 10, 1943
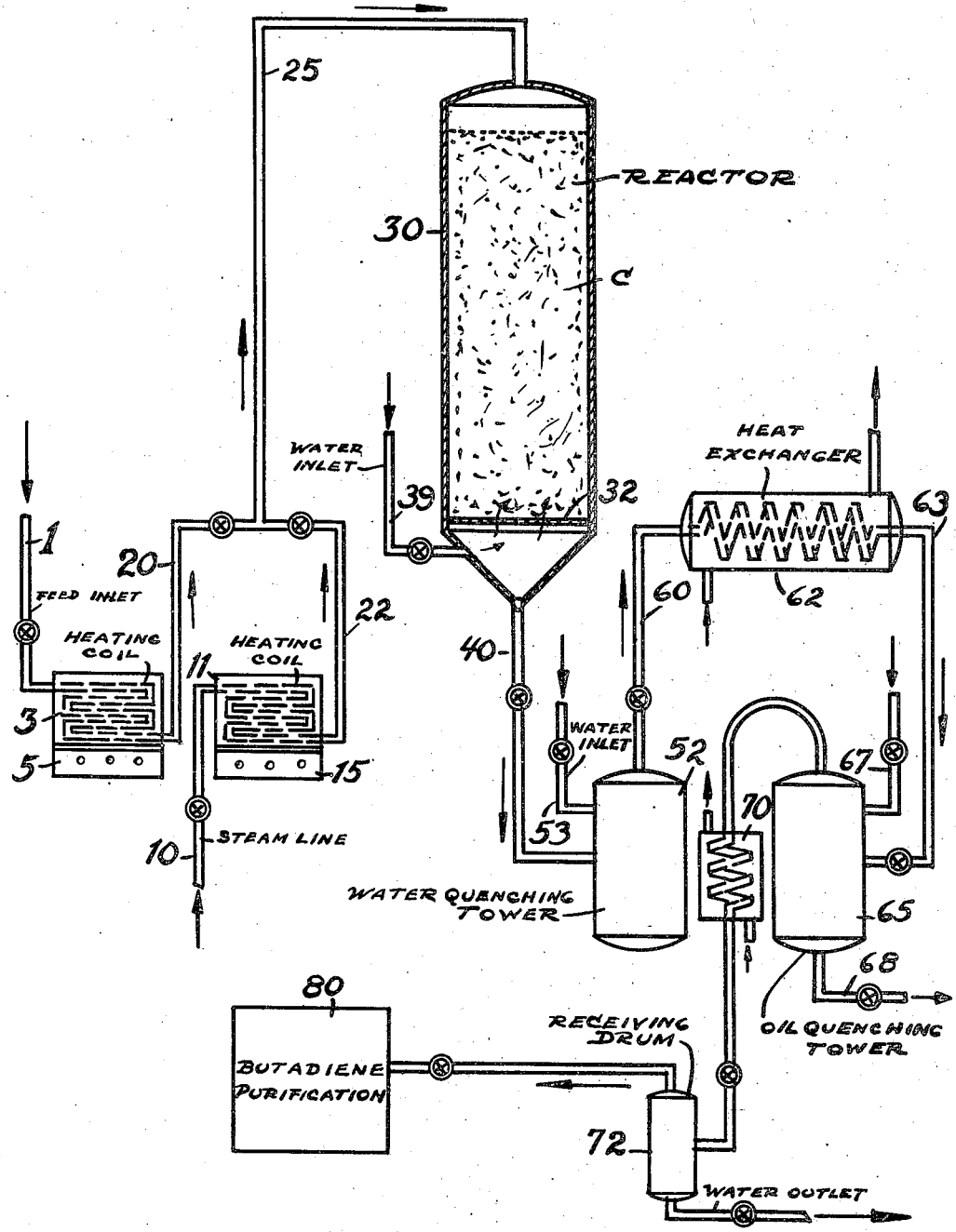
Kenneth C. Laughlin Inventor
By P. L. Young Attorney Patented Aug. 6, 1946

2,405,436

UNITED STATES PATENT OFFICE 2,405,436

CATALYTIC DEHYDROGENATION

Kenneth C. Laughlin, Wilmington, Del., assignor to Standard Oil Development Company, a corporation of Delaware Application November 10, 1943, Serial No. 509,660

7 Claims. (Cl. 260—669)

The present invention relates to catalytic dehydrogenation and more particularly it relates to improvements in the process wherein the catalyst activity is sustained for a longer period of time than that has been possible heretofore.

An illustrative example of my invention is that embodiment of it which has to do with the dehydrogenation of butene to form butadiene. As is known, the manufacture of butadiene has become important recently, due to the fact that butadiene is an important ingredient in the manufacture of synthetic rubber and/or rubber substitutes. A great deal of research has been directed towards improvements in the manufacture of this important ingredient. It has been found, for example, that a number of catalysts which have been described in the application of Kenneth K. Kearby, Serial No. 430,873, filed February 14, 1942, are very valuable for the reason that they are insensitive to steam. This is important for it permits dilution of the feed stock with steam thereby reducing the partial pressure of the butene reactants in the reaction zone and hence counteracting the tendency of butadiene to form degradation and decomposition products with consequent loss of yields. Before the discovery of the catalysts described in the aforesaid Kearby application and before catalysts were used which were not impaired by contact with steam, it was necessary to operate under conditions of reduced pressure such that the total gas pressure in the reaction zone was of the order of 200 mm. of mercury, or thereabouts. Development of this relatively high vacuum, and the preservation thereof, in large commercial installations created difficult engineering problems. Then Kearby discovered a class of catalysts permitting diluting the feed with several volumes of steam per volume of feed whereby the steam served to reduce the partial pressure of the reactants so that polymerization and other degradation reactions were avoided, the said catalysts being unaffected by steam and permitting operation at atmospheric total gas pressure.

The facts set forth immediately above were known prior to my invention and have been stated merely to show the state of the art prior to my said invention. As I have previously indicated, my invention in its essence involved maintaining the activity of the catalyst at a high level, and in general, I accomplish this result by controlling the amount of steam fed to the reactor with the reactants. I accomplish this desired result by feeding less steam to the reactor at the beginning of a productive phase and increasing the amount of steam as the reaction progresses and the catalyst activity decreases.

The dehydrogenation of butene to butadiene is only one of the operations required in the production of butadiene for synthetic rubber manufacture. In order to recover the butadiene in sufficient purity for use in the production of synthetic rubber, elaborate equipment is required to treat the mixture of gas obtained in the dehydrogenation of butene. It is highly desirable that this equipment should operate at uniform capacity rather than at variable capacity as would be required if conversions in the dehydrogenation section of the plant decreased with increased catalyst age. It has been found that with the type of catalyst with which this invention is concerned, for example, the magnesia base type disclosed in the Kearby application referred to hereinbefore, the activity of the catalyst is directly proportional to the amount of steam used as a diluent for the hydrocarbon feed. I make use of this relationship between catalyst activity and steam dilution to maintain substantially uniform conversion during the entire life of the catalyst.

The main object of my present invention therefore is to carry out the catalytic dehydrogenation of olefinic or alkylated aromatic hydrocarbons under conditions such as to maintain uniform dehydrogenation of said hydrocarbons.

Other and further objects of the invention will appear from the following more detailed description and drawing.

In the accompanying drawing I have indicated diagrammatically a flow plan which illustrates a preferred embodiment of my invention.

I shall now describe the dehydrogenation of butene to form butadiene with the understanding that the precise details I am about to enumerate are purely illustrative and do not impose any limitation on my invention.

Butene is introduced into the present system through line 1 and thence heated in a fired coil 3 disposed in a furnace 5 to a temperature of about 1000–1200° F. Simultaneously, steam from some source is charged by line 10 to a superheating coil 11 disposed in a furnace 15 where it is heated to a temperature somewhat higher (1200–1400° F.) than that of the butene feed. Butene is withdrawn from furnace 5 through line 20 while the steam is withdrawn from superheater 15 through line 22 and the said streams are caused to flow into a transfer line 25 and thence into the top of reactor 30 containing a bed of catalyst (C). This catalyst may be one of the class described in the aforesaid Kearby application or any other catalyst which is insensitive to steam. The catalyst may, for example, consist of a magnesium oxide base, iron oxide as the active dehydrogenation component, potassium oxide as the promoter, and copper oxide as the stabilizer. The catalyst is preferably in the physical form of pills, pellets, extruded lengths or other shaped bodies, although it may be in the form of rough granules or lumps, and is supported on a foraminous member 32 which will permit the flow of reactants through the bed of catalyst.

The conditions prevailing within the reactor are well known. For instance, a temperature of 1100–1400° F. gives good results. The contact time should be relatively short, say from a fraction of a second to 5 seconds or slightly more, and the partial pressure of the butenes should be around 200 mm. or less.

My improvements involve varying the steam to hydrocarbon ratio. I shall describe this feature more fully hereinafter, and it will be sufficient to say for the present that the ratio of steam to hydrocarbon is lower at the beginning of the operation than after the productive phase has been in operation for some time.

Continuing the description, the reaction products are withdrawn through line 40 and usually discharged into a quenching tower 52 where they are quenched with water discharged into said tower through line 53. The purpose of the quench is to reduce the temperature of the raw reaction products as rapidly as possible to around 900–1000° F. to prevent degradation thereof. Actually it is preferred to inject water through line 39 into the bottom of the reaction vessel 30 to quench the vapors immediately as they issue from the bed of catalyst, and therefore the preferred procedure is to quench with water at the bottom of the reactor 30 and again with water in quench tower 52 to cool the vapors to well below active dehydrogenation temperatures. The cooled vapors are withdrawn from tower 52 through line 60 and cooled in a waste heat boiler 62 where a portion of their sensible heat may be recovered for some valuable purpose, and then the reaction products are withdrawn through line 63 and discharged into an oil quench tower 65 into which, say cold naphtha is sprayed through line 67 and withdrawn at 68. In the tower 65 the reaction products are cooled to say 220° F. or thereabouts, thereafter passed through a condenser 70 where the steam is condensed, thence passed to a water separator and finally delivered to a purification system 80.

It will not be necessary to understand my invention to describe the usual method of purifying butadiene. It has been previously described by others, and I wish to say that any of the known methods may be employed such as the conventional method of treating the mixture in 80, which will contain mono-olefins as well as diolefins, with a selective solvent and recovering butadiene in pure form by this means.

Passing therefore to the gist of my invention, I shall set forth now in detail the manipulation of the steam to hydrocarbon ratio. However, it is pointed out that due to the fact that dehydrogenation of butene results in the deposition of coky or tarry constituents on the catalyst it is necessary to regenerate the catalyst periodically. Of course, this means discontinuing the flow of butene and treating the catalyst with steam or steam and air to burn off these contaminants. It is conventional to employ two or more reactors 30 so that while one or more is or are undergoing regeneration, the other or others may be employed in the productive phase. When the catalyst is freshly prepared, it is obviously more active than at some subsequent time in the normal operation. During this period of high initial activity, I use a low ratio of steam to hydrocarbon so that less than the maximum conversion is obtained. The amount of steam used is regulated to give a conversion which can be maintained over practically the entire life of the catalyst. When the activity of the catalyst begins to drop off from its initial high level, I gradually increase the amount of steam used as diluent so that the conversion obtained from the catalyst is maintained at a relatively high level. For example, when the catalyst is fresh, I use a ratio of steam to hydrocarbon of about 7–1. After the catalyst has been used for several days, the ratio may be increased so that eventually the ratio of steam to hydrocarbon may be as high as 20 to 1. In this manner substantially uniform conversion may be obtained throughout the life of the catalyst and the amount of butadiene produced by the catalyst before it must be discarded is substantially increased. To show the utility of this procedure, I set forth below the results of an extended run which I made, in which I alternately fed steam and butene for an hour, and regenerated the catalyst with steam for an hour.

During the dehydrogenation of butene-2 over a steam-resistant catalyst, the productive phases of the operation were at the beginning conducted with a steam to butene ratio of 7:1. During this time the percentage butene reacting (conversion) at constant temperature and feed rate decreased as follows:

| Hours of run | Volumes of steam per volume of butene-2 | Percent conversion of butene to butadiene |
|---|---|---|
| 90 | 7:1 | 24.0 |
| 188 | 7:1 | 20.2 |
| 212 | 7:1 | 19.5 |
| 282 | 12:1 | 19.5 |

It will be noted that during the latter portion of the run the decrease in catalyst activity with constant steam of butene ratio was arrested, and a constant rate of conversion was maintained, by an increase in the steam to butene ratio. The ratio of steam to hydrocarbon may be increased up to 20 volumes of steam per volume of hydrocarbon fed to the reaction zone, with good results.

As previously indicated, the principle of my invention may be applied to the dehydrogenation of an alkylated aromatic, such as ethyl benzene, to form styrene. This process may be operated with the same catalyst and under the same operating conditions which I have described in connection with the dehydrogenation of butene-2, or it may be employed to dehydrogenate any straight chain olefin or branch chain olefin, whether normally gaseous or normally liquid, or any alkylated aromatic regardless of the number of benzene rings in a condensed nucleus.

To recapitulate briefly, my present invention has to do with catalytic dehydrogenation and its purposes are to increase yields, to maintain a uniform catalyst activity for a longer period of time than has heretofore been possible and to extend the life of the catalyst, i. e., to render it usable long after it might otherwise have to be discarded because of the low yields obtainable therewith.

My invention has the advantage of maintaining a more nearly uniform degree of dehydrogenation in the presence of a catalyst whose initial activity is higher than its half life activity, by feeding to the reaction zone a lower ratio of steam to hydrocarbon initially. By so operating excessive conversions are avoided with a consequent avoidance of excessive quantities of coky and tarry constituent deposition on the catalyst caused by polymerization and as the catalyst activity tends through continued use to decrease, the steam to hydrocarbon ratio is gradually increased, whereby the catalyst activity is increased and substantially uniform conversion is maintained.

Numerous modifications of my invention will appear to those who are familiar with this art.

What I claim is:

1. In the continuous catalytic dehydrogenation of hydrocarbons carried out at elevated temperatures in the presence of a steam insensitive catalyst and steam, the improvement which comprises maintaining the catalyst activity at a high level by increasing the ratio of steam to hydrocarbon as the catalyst activity tends to decline.

2. In the dehydrogenation of hydrocarbons conducted at elevated temperatures in the presence of a dehydrogenation catalyst and steam with alternate periods of reaction and regeneration, the improvement which comprises starting operation with a fresh steam insensitive catalyst with a steam to hydrocarbon ratio of less than 10 to 1 during the reaction period and gradually increasing said ratio to about 20 to 1 during the life of said catalyst.

3. The method set forth in claim 2 in which excessive conversion is avoided in the initial phase of the operation by employing a steam to hydrocarbon ratio of about 7 to 1.

4. In the continuous catalytic dehydrogenation of butene-2 to form butadiene in the presence of a steam insensitive catalyst and steam, the improvement which comprises increasing the volume ratio of steam to butene-2 fed to a dehydrogenation zone, as the catalyst age increases.

5. The method of claim 4 in which the steam to butene-2 ratio is increased from an initial ratio of the order of 7 to 1 up to a final ratio of the order of 20 volumes of steam per volume of butene-2 fed to the reaction zone, as the catalyst activity decreases.

6. The method of producing butadiene which comprises contacting a mixture of steam and butene-2 with a steam insensitive dehydrogenation catalyst at elevated temperatures in a reaction zone, periodically discontinuing the feed of butene-2 and treating the catalyst with steam to regenerate same, and maintaining the activity of the catalyst during the operation by increasing the volume ratio of steam to butene-2 fed to the reaction zone as the activity of the catalyst is observed to decrease.

7. The method of producing styrene which comprises passing a stream of steam and ethyl benzene over a steam-insensitive solid dehydrogenation catalyst at an elevated temperature, periodically discontinuing the supply of ethyl benzene and treating the catalyst with steam alone to regenerate the same and maintaining the activity of the catalyst during the operation by continually increasing the volume ratio of steam to ethyl benzene as the activity of the catalyst is observed to decrease.

KENNETH C. LAUGHLIN.